United States Patent
Ferrari et al.

(10) Patent No.: US 9,249,289 B2
(45) Date of Patent: Feb. 2, 2016

(54) 1-BUTENE COPOLYMERS COMPOSITIONS FOR EXTRUDED PROFILES

(71) Applicant: Basell Poliolefine Italia S.r.l., Milan (IT)

(72) Inventors: Paolo Ferrari, Ferrar (IT); Luca Lunghi, Ferrara (IT); Roberta Marchini, Ferrara (IT); Stefano Spataro, Ferrara (IT); Giampaolo Pellegatti, Ferrara (IT); Caroline Cathelin, Ferrara (IT); Stefano Pasquali, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 0 days.

(21) Appl. No.: 14/380,578

(22) PCT Filed: Feb. 12, 2013

(86) PCT No.: PCT/EP2013/052765
§ 371 (c)(1),
(2) Date: Aug. 22, 2014

(87) PCT Pub. No.: WO2013/124185
PCT Pub. Date: Aug. 29, 2013

(65) Prior Publication Data
US 2015/0051350 A1  Feb. 19, 2015

Related U.S. Application Data

(60) Provisional application No. 61/603,171, filed on Feb. 24, 2012.

(30) Foreign Application Priority Data

Feb. 24, 2012 (EP) .................. 12156788

(51) Int. Cl.
| | | |
|---|---|---|
| *C08L 23/22* | (2006.01) | |
| *B29C 47/00* | (2006.01) | |
| *C08L 23/20* | (2006.01) | |
| *C08F 210/08* | (2006.01) | |
| *F16J 15/10* | (2006.01) | |
| *B29L 31/00* | (2006.01) | |
| *B29L 31/26* | (2006.01) | |
| *B29K 23/00* | (2006.01) | |

(52) U.S. Cl.
CPC ............ *C08L 23/22* (2013.01); *B29C 47/0004* (2013.01); *C08F 210/08* (2013.01); *C08L 23/20* (2013.01); *F16J 15/102* (2013.01); *B29C 47/003* (2013.01); *B29C 47/0023* (2013.01); *B29K 2023/08* (2013.01); *B29K 2023/14* (2013.01); *B29K 2995/007* (2013.01); *B29L 2031/005* (2013.01); *B29L 2031/006* (2013.01); *B29L 2031/265* (2013.01); *C08L 2205/03* (2013.01)

(58) Field of Classification Search
CPC ..... C08F 210/08; C08L 23/14; C08L 23/142; C08L 23/18
See application file for complete search history.

(56) References Cited

U.S. PATENT DOCUMENTS 7,981,993 B2 *   7/2011   Pellegatti et al. .......... 526/348.6

FOREIGN PATENT DOCUMENTS

| EP | 0302297 A1 | 2/1989 |
|---|---|---|
| WO | WO-2009000637 A1 * | 12/2008 |
| WO | WO-2009130092 A1 * | 10/2009 |
| WO | WO2010/069775 A1 | 6/2010 |
| WO | WO2011/064131 A1 | 6/2011 |

OTHER PUBLICATIONS

PCT International Search Report & Written Opinion mailed Mar. 15, 2013, for PCT/EP2013/052765.

* cited by examiner

*Primary Examiner* — Irina S Zemel
*Assistant Examiner* — Jeffrey Lenihan

(57) ABSTRACT

Extruded or molded profiles comprising a polyolefin composition consisting of 85% by weight or more of a copolymer of 1-butene with ethylene (A) having an ethylene copolymerized content up to 18% by mol, and having Mw/Mn lower than 3, hardness shore A (measured according to ISO 868) lower than 90, no melting point (TmII) detectable at the DSC after cancelling the thermal history, melting enthalpy ($\Delta$Hf), measured by DSC after 10 days of aging at room temperature, comprised between 4 and 15 J/g; and up to 15% by weight of a propylene copolymer or a composition of copolymers of propylene (B) having a melting point from about 126° C. to 200° C., isotactic index greater than 90%.

4 Claims, No Drawings

1-BUTENE COPOLYMERS COMPOSITIONS FOR EXTRUDED PROFILES

This application is the U.S. National Phase of PCT International Application PCT/EP2013/052765, filed Feb. 12, 2013, claiming benefit of priority to European Patent Application No. 12156788.7, filed Feb. 24, 2012, and benefit of priority under 35 U.S.C. §119(e) of U.S. Provisional Application No. 61/603,171 filed Feb. 24, 2012, the contents of which are incorporated herein by reference in their entirety.

FIELD OF THE INVENTION

The present invention relates to 1-butene polymers (homo or copolymers) and compositions thereof for extruded profiles, gaskets, trims, seals and the like, particularly for windows profiles. Molded profiles are also included.

BACKGROUND OF THE INVENTION

Profiles can be solid, hollow, or both. Gaskets and profiles based on molded or extruded thermoplastic elastomeric materials are known in the art.

Extruded profiles find application in building construction articles such as window glaze seals, door or window frame seals, clamping joints for window panes, expansion joints for buildings curtain wall gaps or paved floor gaps, flexible lip seals (windows). Extruded profiles may also find use in vehicular parts such as interior trim, gaskets, O-rings, window seals, door seals, and the like. Such extruded profiles, used as construction, building or vehicle parts (hereinafter "extruded profiles") are intended generally to provide a seal against fluids such as for instance, air, water, and the like. Those seals can be dense or foamed type.

Ethylene, alpha-olefin, diene monomer elastomeric polymer based compounds are known to be generally the elastomers of choice for these demanding extruded profile uses, due to their higher filler acceptance, along with their excellent ozone, weathering and temperature resistance, compared to other previously used elastomers such as styrene butadiene rubber (SBR), butadiene rubber (BR), plasticized polyvinyl chloride, and the like.

Performance specifications of extruded profiles intended for building/construction or vehicular use are targeted toward the best elasticity and service life at high temperature. Also it focuses on good elasticity retention at low temperature to ensure the sealing properties in winter as well as to make sure that the expansion joint fulfills its function after contraction or dilatation of the panels due to thermal variation or building movement. So high elastomeric polymer concentration in extruded profile compounds are generally the norm due to the need for higher elasticity (higher elongation/strain and/or lower tensile or compression set). These facts combined with the needs of the extruded profile part manufacturer to produce a high quality part, at low cost, indicate a need for ever higher performance and manufacturing standards for elastomeric polymers, compounds made from these elastomeric polymers, and parts such as extruded profiles made from these compounds.

Extruded profile manufacturers continue to look for improvements in their manufacturing economies, while maintaining the high quality demand of extruded profiles.

WO9700291 discloses extruded profiles utilizing ethylene, α-olefin, vinyl norbornene elastomeric polymers displaying improved processability and improved vulcanization characteristics having a broader range of useful temperatures, improved compression set, while improving processing and or processing economics.

A problem faced with sealing profiles or molding running around the entire inner surface of a frame in the state of the art is to obtain complete sealing. Care must be taken that the all-round sealing profile is closed in itself, i.e. that the profile ends facing one another are actually joined with one another. To that end, the ends of the continuous profiles facing one another in the corner areas are typically mitered in such a way that the miter joints of profiles arriving from different directions lie perfectly against each other and can then be glued together, welded together where the profiles of plastic, or in the case of rubber profiles, vulcanized together, the occurrence of slit places, irregular joints and the like being able to reduce considerably not only the sealing effect, but also the heat and sound insulation of such seals.

It has now been found that materials according to the present invention are capable to combine advantageous thermo-mechanical properties and processability, meeting the requirements for the application in extruded profile seals (e.g. for use as windows profiles) and also help solving the above said problem of sealing profile ends in itself, avoiding time-consuming, expensive and labor-intensive after treatment of such corner joints (gluing, welding etc.).

The present invention is providing specific materials suitable for producing extruded or molded profiles having self-healing properties, that is to say that at room temperature (25° C.) the material when cut and stick in itself is providing considerable stress at break and strain also without heat or glue treatment.

SUMMARY OF THE INVENTION

Thus, it is an object of the present invention an extruded or molded profile essentially made of a polyolefin composition comprising a specific 1-butene polymer as major component.

Small amounts of additives, such as slip or anti-block agents, fillers pigments and other processing aids, can be included in the composition according to the invention.

It is thus a first object of the present invention an extruded or molded profile, particularly window profile, comprising a polyolefin composition consisting of A) a copolymer of 1-butene with up to 18% mol of copolymerized ethylene, preferably of from 5 to 18% by mole of copolymerized ethylene, even more preferably of from 13 to 18% by mole, corresponding to from about 7 to 10 wt % with respect to the 1-butene copolymer weight; said copolymer being preferably the 85% by weight or more, preferably from 85% to 99% by weight, more preferably from 92% to 95% by weight, of the polyolefin composition having the following properties:
 a) distribution of molecular weight Mw/Mn measured by GPC equal to or less than 3, preferably of from 2 to 3;
 b) hardness shore A (measured according to ISO 868) of less than 90, preferably equal to or less than 70;
 c) no melting point TmII detectable at the DSC;
 d) melting enthalpy (ΔHf), measured by DSC after 10 days of aging at room temperature, of from equal to or greater than 4 to 30 J/g; preferably from 5 to 20 J/g, even more preferably from 5 to 15 J/g. and
B) optionally but preferably up to 15% by weight, preferably from 1% to 15% by weight, more preferably from 5% to 8% by weight, of a propylene copolymer or a composition of copolymers of propylene having the following features i) a melting point of from 126° C. to 200° C.; and
iii) isotactic index greater than 80%, preferably greater than 85%; more preferably greater than 90%; even more preferably greater than 95%.

DETAILED DESCRIPTION OF THE INVENTION

Preferably component A) has a tension set of less than 30% at 100% of deformation at 23° C. (ISO 2285), preferably equal to or less than 20%. Preferably component A) has a percentage of 1-butene units in form of isotactic pentads (mmmm %) greater than 80%, preferably equal to or greater than 85%, even more preferably greater than 90%.

Component B) is an optional but preferred further component, particularly preferred when the amount of comonomer in component A is higher than 14% mole. Component B) is a copolymer of propylene having high crystallinity in terms of isotactic index (the percentage by weight of polymer insoluble in xylene at room temperature is considered the isotactic index of the polymer). Particularly preferred as component B) is a composition of copolymers of propylene. Said preferred composition of polymers of propylene is comprising:

B1) 20-60%, preferably 30-50%, of a copolymer of propylene with ethylene, containing 1% to 5%, preferably 2% to 4% by weight of ethylene;
B2) 40-80%, preferably 50-70%, of a copolymer of propylene with ethylene and a $C_4$-$C_8$ alpha-olefin, the ethylene content being 1% to 5% by weight, preferably 2% to 4% by weight, and the $C_4$-$C_8$ a-olefin content being 6% to 15% by weight, preferably 7% to 12% by weight;

the total content of ethylene in the composition (component B) being 1% to 5%, preferably 2% to 4%, and the total content of $C_4$-$C_8$ a-olefin in the composition being 2.4% to 12%, preferably 3.5% to 8.4%.

The $C_4$-$C_8$ alpha-olefin is preferably of 1-butene, 1-pentene, 1-hexene, 4-methyl-1-pentene and 1-octene. Particularly preferred is 1-butene.

Said propylene homo or co-polymer component B) can be produced by conventional processes polymerizing propylene and, optionally, an α-olefin mentioned above in the presence of a suitable catalyst, such as a stereospecific Ziegler-Natta catalysts or a metallocene catalyst. Component B) can be prepared according to the process described in EP 674 991.

The 1-butene polymer component A) exhibits a good balance between hardness and elastic behavior better described in term of tension set, further it shows good values of clarity. The 1-butene polymer component A) just after it has been melted does not show a melting point associated to polybutene-1 crystallinity, however it is crystallizable, i.e. after about 10 days that it has been melted the polymer shows a measurable melting point and a melting enthalpy measured by DSC. In other words the 1-butene polymer no melting temperature attributable to polybutene crystallinity $(TmII)_{DSC}$, measured after cancelling the thermal history of the sample, according to the DSC method described herein below in the experimental part.

The 1-butene polymer component A) is preferably endowed with tensile stress at break measured according to ISO 527 of from 3 MPa to 20 MPa, preferably from 4 to 13 MPa. Preferably the 1-butene polymer component A) is also endowed with tensile strain at break measured according to ISO 527 of from 550% to 800%; preferably from 600% to 750%.

The 1-butene polymer component A is also endowed with a high molecular weight, expressed in terms of intrinsic viscosity (IV) it is higher than 1 dl/g; preferably higher than 1.5.

The intrinsic viscosity (IV) is preferably not higher than 3. Higher IV is associated with scarce processability of the copolymer.

Preferably, the 1-butene polymer (A) suitable for the use according to the invention has a low crystallinity of less than 30% measured via X-ray, preferably less than 20%, even more preferably lower than 10%.

Preferably, the 1-butene polymer has a density of 0.895 $g/cm^3$ or less, more preferably of 0.875 $g/cm^3$ or less.

Preferably, the 1-butene polymer has content of xylene insoluble fraction at 0° C. less than 40 wt %, preferably of less than 20 wt %, more preferably less than 15 wt %.

The 1-butene copolymer A) can be obtained by polymerizing the monomer(s) in the presence of a metallocene catalyst system obtainable by contacting:
a stereorigid metallocene compound;
an alumoxane or a compound capable of forming an alkyl metallocene cation; and, optionally,
an organo aluminum compound.

Examples of the said catalyst system and of polymerization processes employing such catalyst system can be found in WO2004/099269 and WO2009/000637.

In general, the polymerization process for the preparation of the 1-butene copolymer (A) can be carried out according to known techniques, for example slurry polymerization using as diluent a liquid inert hydrocarbon, or solution polymerization using for example the liquid 1-butene as a reaction medium. Moreover, it may also be possible to carry out the polymerization process in the gas-phase, operating in one or more fluidized bed or mechanically agitated reactors. The polymerization carried out in the liquid 1-butene as a reaction medium is preferred.

As a general rule, the polymerization temperature is generally comprised between −100° C. and +200° C., preferably from 20 to 120° C., more preferably from 40 to 90° C., most preferably from 50° C. to 80° C.

The polymerization pressure is generally comprised between 0.5 and 100 bar.

The polymerization can be carried out in one or more reactors that can work under same or different reaction conditions such as concentration of molecular weight regulator, comonomer concentration, temperature, pressure etc.

The 1-butene copolymer component (A) is present preferably as a majority component, preferably more than 90 wt % of the composition A+B suitable for extruded profiles according to the present invention.

The overall workability of the plastomeric component (A), is also advantageously improved by the said crystalline propylene polymer component (B). Furthermore, the balance of tensile stress and strain is significantly improved. Particularly surprisingly the stress at break measured after cut and stick is increased (while the elongation is reduced) when component B is added e.g. by in-line compounding after the step of production of component (A). The crystalline propylene polymer (B) has typically a value of melt flow rate (MFR) ISO 1133 at 230° C., 2.16 kg of from 0.6 to 10 g/10 min, preferably of from 2 to 10 g/10 min, and preferably melting temperature DSC of from 130° C. to 160° C.

Component (A) and (B) can be for example melt blended directly in extrusion or co-extrusion process or blended and pelletized to be subsequently used in an extrusion or moulding process.

The 1-butene polymer component (A) used as the major component for the preparation of the profiles according to the present invention, is typically exhibiting from elastomeric to plastomeric behavior.

The particulars are given in the following examples, which are given to illustrate, without limiting, the present invention.

EXAMPLES

The following standard procedures were used for testing the properties defined in the examples and in the general description.

Intrinsic viscosity: determined in tetrahydronaphthalene at 135° C. (ASTM D 2857);

MFR: ISO 1133 with a load of 2.16 kg at 190° C. (except where different temperature and load are specified);

Density: ISO 1183;

Flexural elastic modulus: ISO 178

Hardness (Shore A): ISO 868;

Tg determination via DMTA analysis

Molded specimen of 76 mm by 13 mm by 1 mm are fixed to the DMTA machine for tensile stress. The frequency of the tension and relies of the sample is fixed at 1 Hz. The DMTA translate the elastic response of the specimen starting form −100° C. to 130° C. In this way it is possible to plot the elastic response versus temperature. The elastic modulus for a viscoelastic material is defined as E=E'+iE". The DMTA can split the two components E' and E" by their resonance and plot E' vs temperature and E'/E"=tan (δ) vs temperature.

The glass transition temperature Tg is assumed to be the temperature at the maximum of the curve E'/E"=tan (δ) vs temperature.

Comonomer contents: determined by IR spectroscopy or by NMR (when specified).

Particularly for the 1-butene copolymers the amount of comonomers was calculated from $^{13}$C-NMR spectra of the copolymers of the examples. Measurements were performed on a polymer solution (8-12 wt %) in dideuterated 1,1,2,2-tetrachloro-ethane at 120° C. The $^{13}$C NMR spectra were acquired on a Bruker AV-600 spectrometer operating at 150.91 MHz in the Fourier transform mode at 120° C. using a 90° pulse, 15 seconds of delay between pulses and CPD (WALTZ16) to remove $^{1}$H-$^{13}$C coupling. About 1500 transients were stored in 32K data points using a spectral window of 60 ppm (0-60 ppm).

Copolymer Composition

Diad distribution is calculated from $^{13}$C NMR spectra using the following relations:

$PP=100I_1/\Sigma$ $PB=100I_2/\Sigma$ $BB=100(I_3-I_{19})/\Sigma$ $PE=100(I_5+I_6)/\Sigma$ $BE=100(I_9-I_{10})/\Sigma$ $EE=100(0.5(I_{15}+I_6+I_{10})+0.25(I_{14}))/\Sigma$ Where $\Sigma=I_1+I_2+I_3-I_{19}+I_5+I_6+I_9+I_{10}+0.5(I_{15}+I_6+I_{10})+0.25(I_{14})$ The molar content is obtained from diads using the following relations:

$P(m\%)=PP+0.5(PE+PB)$ $B(m\%)=BB+0.5(BE+PB)$ $E(m\%)=EE+0.5(PE+BE)$ $I_1, I_2, I_3, I_5, I_6, I_9, I_6, I_{10}, I_{14}, I_{15}, I_{19}$ are integrals of the peaks in the $^{13}$C NMR spectrum (peak of EEE sequence at 29.9 ppm as reference). The assignments of these peaks are made according to J. C. Randal, Macromol. Chem Phys., C29, 201 (1989), M. Kakugo, Y. Naito, K. Mizunuma and T. Miyatake, Macromolecules, 15, 1150, (1982), and H. N. Cheng, Journal of Polymer Science, Polymer Physics Edition, 21, 57 (1983). They are collected in Table A (nomenclature according to C. J. Carman, R. A. Harrington and C. E. Wilkes, Macromolecules, 10, 536 (1977)).

TABLE A

| I | Chemical Shift (ppm) | Carbon | Sequence |
|---|---|---|---|
| 1 | 47.34-45.60 | $S_{\alpha\alpha}$ | PP |
| 2 | 44.07-42.15 | $S_{\alpha\alpha}$ | PB |
| 3 | 40.10-39.12 | $S_{\alpha\alpha}$ | BB |
| 4 | 39.59 | $T_{\delta\delta}$ | EBE |
| 5 | 38.66-37.66 | $S_{\alpha\gamma}$ | PEP |
| 6 | 37.66-37.32 | $S_{\alpha\delta}$ | PEE |
| 7 | 37.24 | $T_{\beta\delta}$ | BBE |
| 8 | 35.22-34.85 | $T_{\beta\beta}$ | XBX |
| 9 | 34.85-34.49 | $S_{\alpha\gamma}$ | BBE |
| 10 | 34.49-34.00 | $S_{\alpha\delta}$ | BEE |
| 11 | 33.17 | $T_{\delta\delta}$ | EPE |
| 12 | 30.91-30.82 | $T_{\beta\delta}$ | XPE |
| 13 | 30.78-30.62 | $S_{\gamma\gamma}$ | XEEX |
| 14 | 30.52-30.14 | $S_{\gamma\delta}$ | XEEE |
| 15 | 29.87 | $S_{\delta\delta}$ | EEE |
| 16 | 28.76 | $T_{\beta\beta}$ | XPX |
| 17 | 28.28-27.54 | $2B_2$ | XBX |
| 18 | 27.54-26.81 | $S_{\beta\delta}+2B_2$ | BE, PE, BBE |
| 19 | 26.67 | $2B_2$ | EBE |
| 20 | 24.64-24.14 | $S_{\beta\beta}$ | XEX |
| 21 | 21.80-19.50 | $CH_3$ | P |
| 22 | 11.01-10.79 | $CH_3$ | B |

Fractions soluble and insoluble in xylene at 25° C. (XS 25° C.): 2.5 g of polymer are dissolved in 250 mL of xylene at 135° C. under agitation. After 20 minutes the solution is allowed to cool to 25° C., still under agitation, and then allowed to settle for 30 minutes. The precipitate is filtered with filter paper, the solution evaporated in nitrogen flow, and the residue dried under vacuum at 80° C. until constant weight is reached. Thus, one calculates the percent by weight of polymer soluble (Xylene Solubles—XS) and insoluble at room temperature (25° C.).

The percent by weight of polymer insoluble in xylene at ambient temperature (25° C.) is considered the isotactic index of the polymer. This value corresponds substantially to the isotactic index determined by extraction with boiling n-heptane, which by definition constitutes the isotactic index of polypropylene polymers.

Fractions soluble and insoluble in xylene at 0° C. (XS 0° C.): 2.5 g of the polymer sample are dissolved in 250 ml of xylene at 135° C. under agitation. After 30 minutes the solution is allowed to cool to 100° C., still under agitation, and then placed in a water and ice bath to cool down to 0° C. Then, the solution is allowed to settle for 1 hour in the water and ice bath. The precipitate is filtered with filter paper. During the filtering, the flask is left in the water and ice bath so as to keep the flask inner temperature as near to 0° C. as possible. Once the filtering is finished, the filtrate temperature is balanced at 25° C., dipping the volumetric flask in a water-flowing bath for about 30 minutes and then, divided in two 50 ml aliquots. The solution aliquots are evaporated in nitrogen flow, and the residue dried under vacuum at 80° C. until constant weight is reached. The weight difference in between the two residues must be lower than 3%; otherwise the test has to be repeated. Thus, one calculates the percent by weight of polymer soluble (Xylene Solubles at 0° C.=XS 0° C.) from the average weight of the residues. The insoluble fraction in o-xylene at 0° C. (xylene Insolubles at 0° C.=XI % 0° C.) is:

XI % 0° C.=100−XS % 0° C.

Determination of X-ray crystallinity

The X-ray crystallinity was measured with an X-ray Diffraction Powder Diffractometer using the Cu-Kα1 radiation with fixed slits and collecting spectra between diffraction angle 2Θ=5° and 2Θ=35° with step of 0.1° every 6 seconds.

Measurements were performed on compression molded specimens in the form of disks of about 1.5-2.5 mm of thickness and 2.5-4.0 cm of diameter. These specimens are obtained in a compression molding press at a temperature of 200° C.±5° C. without any appreciable applied pressure for 10 minutes. Then applying a pressure of about 10 Kg/cm² for about few second and repeating this last operation for 3 times.

The diffraction pattern was used to derive all the components necessary for the degree of crystallinity by defining a suitable linear baseline for the whole spectrum and calculating the total area (Ta), expressed in counts/sec·2Θ, between the spectrum profile and the baseline. Then a suitable amorphous profile was defined, along the whole spectrum, that separate, according to the two phase model, the amorphous regions from the crystalline ones. Thus it is possible to calculate the amorphous area (Aa), expressed in counts/sec·2Θ, as the area between the amorphous profile and the baseline; and the crystalline area (Ca), expressed in counts/sec·2Θ, as Ca=Ta−Aa The degree of crystallinity of the sample was then calculated according to the formula:

% Cr=100×Ca/Ta

The thermal properties (melting temperatures and enthalpies) were determined by Differential Scanning calorimetry (D.S.C.) on a Perkin Elmer DSC-7 instrument. The melting temperatures of 1-butene homo and co-polymers were determined according to the following method:

TmII (measured in second heating run): a weighted sample (5-10 mg) obtained from the polymerization was sealed into aluminum pans and heated at 200° C. with a scanning speed corresponding to 20° C./minute. The sample was kept at 200° C. for 5 minutes to allow a complete melting of all the crystallites thus cancelling the thermal history of the sample. Successively, after cooling to −20° C. with a scanning speed corresponding to 10° C./minute, the peak temperature was taken as crystallization temperature (Tc). After standing 5 minutes at −20° C., the sample was heated for the second time at 200° C. with a scanning speed corresponding to 10° C./min. In this second heating run, the peak temperature when present was taken as the melting temperature of the poly 1-butene (PB) crystalline form II (TmII) and the area as global melting enthalpy (ΔHfII).

The melting enthalpy after 10 days and the melting temperature of crystalline form I (TmI) was measured as follows by using the Differential Scanning calorimetry (D.S.C.) on an Perkin Elmer DSC-7 instrument: A weighted sample (5-10 mg) obtained from the polymerization was sealed into aluminum pans and heated at 200° C. with a scanning speed corresponding to 20° C./minute. The sample was kept at 200° C. for 5 minutes to allow a complete melting of all the crystallites. The sample was then stored for 10 days at room temperature. After 10 days the sample was subjected to DSC, it was cooled to −20° C., and then it was heated at 200° C. with a scanning speed corresponding to 10° C./min. In this heating run, the first peak temperature coming from the lower temperature side in the thermogram was taken as the melting temperature (TmI), and the area as global melting enthalpy after 10 days (ΔHf). Sometimes at least partially convoluted TmI and TmII temperatures peaks can be evidenced with this procedure. (ΔHf) is measured as the total hentalpy of the overall at least partially convoluted peak.

When a propylene crystallinity is present coming from addition of a polypropylene polymer component B), a further melting temperature peak (PP) can be detected at higher temperatures.

Determination of isotactic pentads content: 50 mg of each sample were dissolved in 0.5 mL of $C_2D_2Cl_4$.

The $^{13}C$ NMR spectra were acquired on a Bruker DPX-400 (100.61 Mhz, 90° pulse, 12 s delay between pulses). About 3000 transients were stored for each spectrum; mmmm pentad peak (27.73 ppm) was used as reference.

The microstructure analysis was carried out as described in literature (Macromolecules 1991, 24, 2334-2340, by Asakura T. et Al. and Polymer, 1994, 35, 339, by Chujo R. et Al.).

The percentage value of pentad tacticity (mmmm %), provided in the experimental part for 1-butene homo and copolymers, is the percentage of stereoregular pentads (isotactic pentad) as calculated from the relevant pentad signals (peak areas) in the NMR region of branched methylene carbons (around 27.73 ppm assigned to the BBBBB isotactic sequence), with due consideration of the superposition between stereoirregular pentads and of those signals, falling in the same region, due to the alfa-olefin comonomer (e.g propylene or ethylene derived units when present).

MWD Determination by Gel Permeation Chromatography (GPC)

Molecular weight parameters and molecular weight distributions (e.g. Mw/Mn) for all the samples were measured using a Waters GPCV 2000 apparatus, which was equipped with a column set of four PLgel Olexis mixed-gel (Polymer Laboratories) and an IR4 infrared detector (PolymerChar). The dimensions of the columns were 300×7.5 mm and their particle size 13 µm. The mobile phase used was 1-2-4-trichlorobenzene (TCB) and its flow rate was kept at 1.0 mL/min. All the measurements were carried out at 150° C. Solution concentrations were 0.1 g/dL in TCB and 0.1 g/L of 2,6-diterbuthyl-p-chresole were added to prevent degradation. For GPC calculation, a universal calibration curve was obtained using 10 polystyrene (PS) standard samples supplied by Polymer Laboratories (peak molecular weights ranging from 580 to 8500000). A third order polynomial fit was used for interpolate the experimental data and obtain the relevant calibration curve. Data acquisition and processing was done using Empower (Waters). The Mark-Houwink relationship was used to determine the molecular weight distribution and the relevant average molecular weights: the K values were $K_{PS}=1.21 \times 10^{-4}$ dL/g and $K_{PB}=1.78 \times 10^{-4}$ dL/g for PS and PB respectively, while the Mark-Houwink exponents α=0.706 for PS and α=0.725 for PB were used.

For butene/ethylene copolymers, as far as the data evaluation is concerned, it was assumed for each sample that the composition was constant in the whole range of molecular weight and the K value of the Mark-Houwink relationship was calculated using a linear combination as reported below:

$K_{EB}=x_E K_{PE}+x_P K_{PB}$ where $K_{EB}$ is the constant of the copolymer, $K_{PE}$ (4.06×10⁻⁴, dL/g) and $K_{PB}$ (1.78×10⁻⁴ dL/g) are the constants of polyethylene and polybutene, $x_E$ and $x_B$ are the ethylene and the butene wt % content. The Mark-Houwink exponents α=0.725 was used for all the butene/ethylene copolymers independently on their composition.

For Butene/propylene copolymers, as PP and PB have very similar K, no corrections were applied and the copolymer was integrated using the K and α values of PB.

Tensile stress and strain at break (ISO 527) were measured on compression molded plaques for the composition as reported in table 1.

Tension set (ISO 2285)

Determination of stress and strain at break measured on cut and stick samples:

Test specimens were obtained from the same compositions of table 1. Compression molded plaques were prepared with a conventional compression molding machine set at 250° C. and cooled at 30±2° C./min constant controlled rate, obtained in compliance with ISO 8986-2 requirements. Plaque dimensions were 120×120×4 mm. Test specimen having dimension of 10×80×4 mm were die punched from the compression molded plaque (tolerances: Thickness 4.0±0.2, Length 80±2 Width 10±0.2 mm).

Compression molded plaques were conditioned 10 days at 23±2° C. and 50±10% relative humidity before die-punching, then tested immediately.

Each test specimen, die punched from a compression molded plaque, was inserted in the tensile tester grips (tensile tester ZWICK Z030—force calibration according to ISO 7500-1 class 0.5). Grip distance was set at 20±1 mm. Then the specimen was cut in the middle by means of conventional scissors (general purpose scissor with sharp blades). Immediately after cut, each specimen was re-attached at a constant speed of 10 mm/min until a constant load of 20±1 N was reached. Thus, each specimen was re-attached at controlled speed, force and time.

A metallic guide (0.1 mm wider than specimen thickness) was used in order to prevent misalignments of specimen parts during re-adhesion step under load.

Test specimen was then removed and conditioned for at least 1 hour before tensile test.

The so obtained cold-welded (re-attached) specimen underwent conventional tensile properties measurement (according ISO 527) with the same tensile tester (ZWICK Z030).

Samples were pulled at constant speed of 500 mm/min, the stress-strain curve was recorded, stress and strain at break were then calculated and reported as indicators of adhesion performances. 10 specimens were evaluated for each polymer composition tested. The average value is reported in table 2. If the break occurred outside the welded region in one of the intact legs, test result was not considered as an indication of adhesion resistance in the re-welded region and data rejected.

Materials Used in the Examples

PB1 and PB3 are 1-butene/ethylene copolymers (component A) produced according to the process described in WO2004/099269 and WO2009/000637.

PB2 was obtained from PB1 by in-line compounding a crystalline low sit polymer (component B) added in amount of 7 wt % with respect to the weight of the composition (A+B). Component having MFR of 5.50 g/10 min @ 230° C./2.16 kg, total copolymerized ethylene content abt. 3 wt %, 1-butene content copolymerized abt. 6 wt %; isotactic index (XS-25° C.) 19 wt % and melting point 133° C. Component B is comprising:

B1) 35 wt % of a copolymer of propylene with ethylene (3.2 wt % in the copolymer), and B2) 65 wt % of a copolymer of propylene with ethylene (3.2 wt % in the copolymer) and 1-butene (abt. 6 wt % in the copolymer).

PB4 is a comparative 1-butene copolymer with propylene produced with Ziegler Natta catalyst in absence of external donor according to the process described in the International application WO2006/042815 A1.

The resultant compositions of examples were pelletized and dried with use of commercial additives, antisticking agents to improve flowability and contributing to the handability of the compositions. Finishing treatments lead to a total amount of additives in the final pellets typically Less than 1.0 wt %, preferably less than 0.5 wt % even more preferably less than 0.2 wt % (about 100-1500 ppm per additive or less). Examples of such finishing treatments can be found in the international patent application PCT/EP2010/056159.

Table 1 is reporting the structures and properties of 1-butene copolymers according to the invention and comparatives.

TABLE 1

|  |  | PB1 | PB2 | PB3 | Tafmer S4030 Plastomer type | PB4 |
|---|---|---|---|---|---|---|
|  |  | Ex 1 C4C2 | Ex 2 C4C2C3** | Ex 3 C4C2 | Comp. Ex 4 C3C2 | Comp. Ex 5 C4C3 |
| C3 content (NMR) | wt % | — | 6.3 | — | 66 | 3.9 |
| C2 content (NMR) | wt % | 8.3 | 8.6 | 4.8 (IR 5.4) | 34 | — |
| Intrinsic Viscosity | dl/g | 2.05 | 1.9 | 1.95 |  | 2.3 |
| Melt Flow Rate - @ 190/2.16 | g/10 min | 1.1 | 1.0 | 1 |  | 0.45 |
| Density | g/cc | 0.874 | 0.8673 | 0.8830 |  | 0.8786 |
| Flexural elastic modulus (ISO 178) | MPa | <10 | <10 | 75 |  | 31 |
| Hardness Shore A (ISO 868) |  | 65 | 61.8 | 89.4 |  | 74.5 |
| Tg (DMTA) | ° C. | −26.3 | −27 | −22 |  | −5.8 |
| % cristall. RX | % | 7 | 9 | 25 |  | 29 |
| DSC Tm II* | ° C. | Nd | nd (PB) 158 (PP) | nd |  | 100 |
| DSC Tm I |  | 40 | 40.3 158 (PP) | 49 |  | 118 |
| S.X.0/0° C. Soluble Total | wt % | 99 | 94.6 | 99 |  | 57 |
| mmmm % | % | 91 | 90 | 90 |  | 54 |
| Mw/Mn |  | 2.3 | 2.9 | 2.8 |  | 6.1 |

TABLE 1-continued

| | | PB1 | PB2 | PB3 | Tafmer S4030 | PB4 |
|---|---|---|---|---|---|---|
| | | | | Plastomer type | | |
| | | Ex 1 C4C2 | Ex 2 C4C2C3** | Ex 3 C4C2 | Comp. Ex 4 C3C2 | Comp. Ex 5 C4C3 |
| ΔHf after 10 days | J/g | 6.7 | 11.5 | 26.97 | — | — |
| 1,4 insertions | | na | na | na | na | absent |
| Stress at break ISO527 | | 5.8 | 11.7 | 16.9 | 0.7 | 12.9 |
| Strain at break ISO527 | | 626 | 735 | 550 | 1030 | 410 |
| Tension set, 100% at 23° C. | | 16 | 6 | 58 | | 39 |

Nd = not detectable
Na = data not available
*from DSC thermogram collected in second heating run (after cancelling the thermal history of the sample)
**content of propylene derived units (C3 content NMR) comes from in-line compounding with 7 wt % of a low sit crystalline propylene component (B)

Table 2 reports tensile and adhesive properties of the compositions according to ex 1-5 after cut and stick according to the method described.

TABLE 2

| Variable Name | Units | Ex 1 PB1 | Ex 2 PB2 | Ex 3 PB3 | Comp. Ex4 Tafmer S4030 | Comp. Ex5 PB5 |
|---|---|---|---|---|---|---|
| Stress at break | MPa | 1.15 | 1.55 | 2.1 | 0.64 | Non adhesion |
| Strain at break | % | 350 | 40 | 7 | 86 | Non adhesion |
| break along scissor rupture, i.e. where cut and stick | | Yes | Yes | Yes | Yes | Non adhesion |

The invention claimed is:

1. An article comprising a polyolefin composition consisting of:
A) a copolymer of 1-butene with ethylene having ethylene copolymerized content up to 18% by mol and, wherein component A) has the following properties:
  a) distribution of molecular weight Mw/Mn equal to or less than 3;
  b) hardness shore A (measured according to ISO 868) of equal to or less than 90;
  c) no melting point TmII detectable at the DSC;
  d) melting enthalpy (ΔHf), measured by DSC after 10 days of aging at room temperature, of from 4 to 30 J/g; and optionally
B) up to 15% by weight of a propylene copolymer or a composition of copolymers of propylene, wherein component B) has the following properties:
  i) a melting point from about 126° C. to 200° C.; and
  iii) isotactic index equal to or greater than 80%
wherein the article has the form of a window glaze seal, door or window frame seal, a clamping joint for window panes, an expansion joint for buildings curtain wall gaps or paved floor gaps, a flexible lip seal (windows), a trim, a gasket, or an o-ring.

2. The article according to claim 1, wherein component B) is a composition of polymers of propylene comprising:
B1) 20-60% by weight of a copolymer of propylene with ethylene, containing 1% to 5% by weight of ethylene, based upon the total weight of component B1);
B2) 40-80% by weight of a copolymer of propylene with ethylene and a $C_4$-$C_8$ alpha-olefin, the ethylene content being 1% to 5% by weight, based upon the total weight of component B2), and the $C_4$-$C_8$ a-olefin content being 6% to 15% by weight, based upon the total weight of component B2);
the total content of ethylene in the composition being 1% to 5% by weight, based upon the total weight of component B) and the total content of $C_4$-$C_8$ a-olefin in the composition being 2.4% to 12% by weight, based upon the total weight of component B).

3. The article of claim 1, wherein the article is an extruded or molded article.

4. The article of claim 3, wherein the article has the form of a gasket.

* * * * *